United States Patent [19]
Bentley

[11] 3,762,519
[45] Oct. 2, 1973

[54] CENTRIFUGALLY OPERATED IMPACT AND FRICTION CLUTCHES

[76] Inventor: Arthur P. Bentley, P.O. Box 139, Boerne, Tex. 78006

[22] Filed: July 5, 1972

[21] Appl. No.: 269,115

[52] U.S. Cl............... 192/105 BB, 192/38, 192/45, 192/53 R, 192/105 B, 173/93.6
[51] Int. Cl............................................. F16d 43/06
[58] Field of Search..................... 192/30 R, 38, 45, 192/105 B, 105 BB, 103 B; 74/230.17 E; 173/93.6

[56] References Cited
UNITED STATES PATENTS

| | | | |
|---|---|---|---|
| 3,193,069 | 7/1965 | Bloomquist | 192/30 R |
| 3,265,172 | 8/1966 | Atsumi et al. | 192/105 B X |
| 3,268,014 | 8/1966 | Drew | 173/97 |

Primary Examiner—Benjamin W. Wyche
Attorney—Eric P. Schellin et al.

[57] ABSTRACT

A transmission comprising an input shaft journalled in a housing carrying a power output. Splined on the shaft is a disc having sockets in axially staggered relation opening onto its periphery and in each of which a steel ball is radially movable. The disc is biased towards one end of the housing by a spring and this end is formed with a conical surface that is engaged by the balls. Where the conical surface terminates at its larger end, the inner surface of the housing is formed with a plurality of arcuate recesses which correspond in number to the balls. The recesses and balls are axially staggered and each recess has a small angle of inclination at the entry end for a ball and a more abrupt end which is engaged by a ball after it has moved up the conical surface by centrifugal and entered the recess with a hammer-like impact. The ball may also engage a friction clutch between the shaft and housing.

8 Claims, 5 Drawing Figures

PATENTED OCT 2 1973 3,762,519
SHEET 1 OF 2
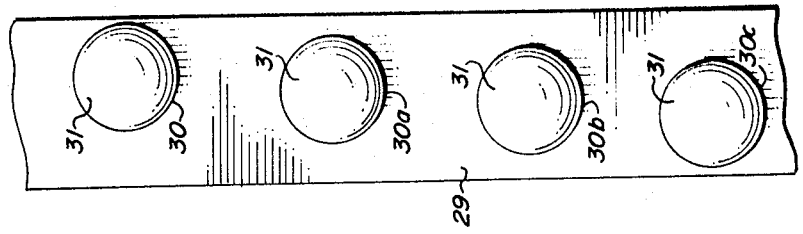
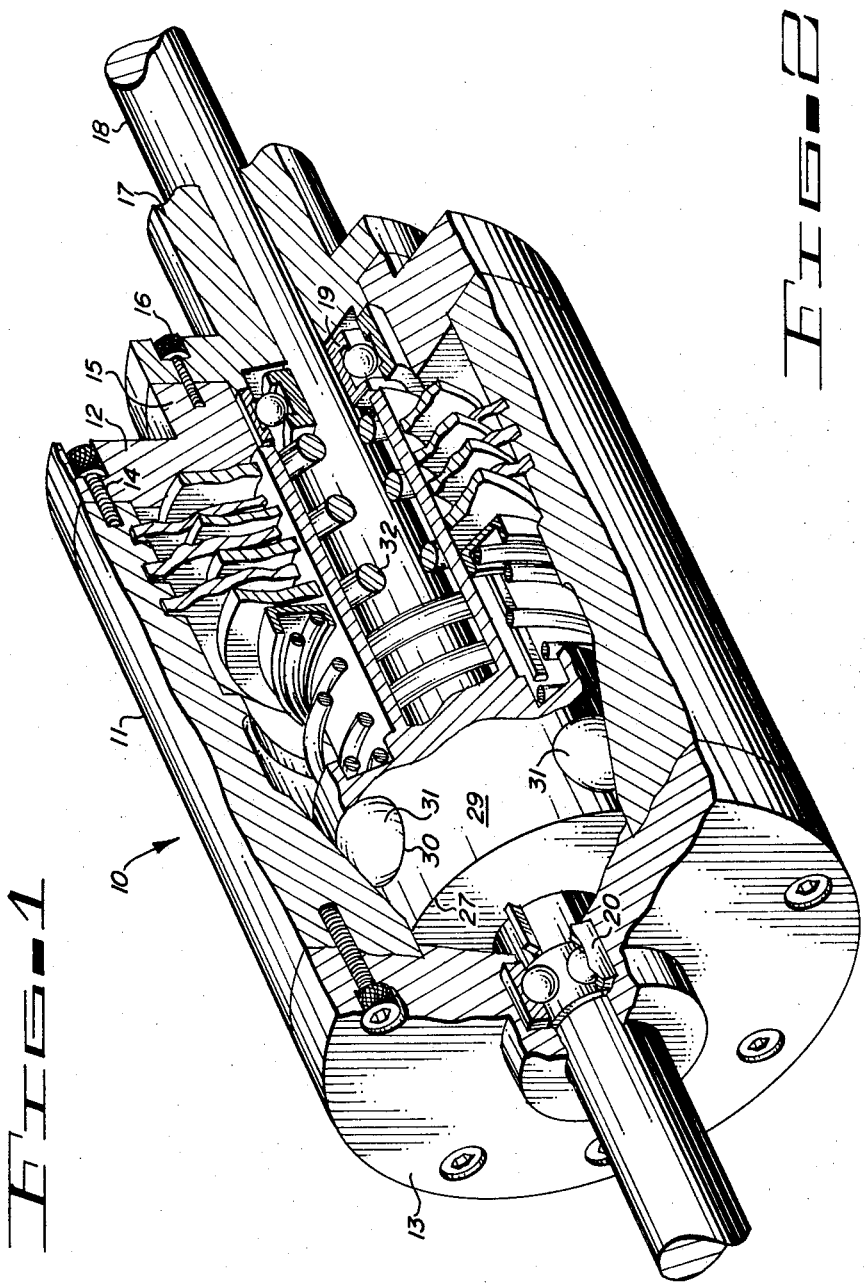

CENTRIFUGALLY OPERATED IMPACT AND FRICTION CLUTCHES

The present invention relates to transmissions and is concerned primarily with what might be called an impact transmission, in that a 1:1 ratio between a power input and a power output is ultimately achieved when steel balls in a disc carrier are rotated and moved by centrifugal force into recesses in a housing carrying the output and engage the ends of the recesses with hammer-like impacts.

BACKGROUND OF THE INVENTION

At the present time, there are known many transmissions and clutches which include balls as elements thereof. In some instances, these balls are moved radially to vary the ratio between driving and driven members. However, in the known devices of this type the balls are moved radially by mechanical means rather than centrifugal force.

There are clutches which are known and which include conical surfaces over which balls move into interlocked engagement with grooves in a driven member. Here, again, the balls are not moved radially by centrifugal force.

OBJECTS OF THE INVENTION

With the foregoing conditions in mind, the present invention has in view the following objectives:

1. To provide a transmission in which a 1:1 ratio between driving and driven members is finally established by balls which when rotated by the driving member enter recesses in the driven member under the influence of centrifugal force and engage ends of these recesses with impact.

2. To provide, in a transmission of the type noted, a driven member in the form of a housing having a conical surface at one end and which merges with a cylindrical surface that is formed with a series of staggered recesses immediately adjacent to the line of merger between said conical and cylindrical surfaces.

3. To provide, in a transmission of the character aforesaid, recesses in the driven member which are of arcuate shape and each of which has a ball entry of small inclination and an abrupt end which is engaged by a ball with impact.

4. To provide, in a transmission of the kind described, a driving assembly comprising an input shaft and a disc carrier for the balls that is splined on the shaft and biased towards the conical surface on the driven member by a spring to cause the balls to engage the conical surface.

5. To provide, in a transmission of the type noted, a ball carrier disc having sockets in axially staggered relation which open onto the periphery of the disc with each socket receiving a steel ball that is radially movable therein by centrifugal force.

6. To provide a transmission of the type noted that includes a clutch between the driving and driven members and which is rendered effective when an excessive load is encountered by the driven member.

Various other more detailed objects and advantages of the invention such as arise in connection with carrying out the above ideas in a practical embodiment will, in part, become apparent, and, in part, be hereafter stated as the description of the invention proceeds.

SUMMARY OF THE INVENTION

The foregoing objects are achieved by providing a transmission comprising a driving assembly including a ball carrying disc that is splined to an input shaft and a driven assembly including a cylindrical housing in which the shaft is journalled and having a conical surface at one end which is joined at its wider end to a cylindrical surface. A plurality of axially staggered arcuate recesses corresponding in number to the number of balls are formed in the cylindrical surface immediately adjacent to the conical surface. Each of these recesses has a bottom surface of a small angle of inclination at the end where a ball enters and an abrupt end remote from this ball entry which is engaged by a ball with a hammer-like impact.

The housing includes an end wall remote from the conical surface and an expansion coil spring is interposed between this end wall and the ball carrying disc. This spring biases the balls into engagement with the conical surface and, as the disc is rotated, and the rate of rotation increased, the balls are moved radially outwardly under centrifugal force and travel over the conical surface towards its wider end. During this travel, the disc is moved axially of the shaft against the influence of the spring and the ratio of rotation between the driving and driven members is gradually decreased until the balls enter the recesses to ultimately establish a 1:1 ratio.

While it is believed that it will not be required under all conditions of service usage, a disc clutch is interposed between the driving and driven members. This clutch comprises a plurality of discs which are drivably mounted on a sleeve positioned about the shaft and having one end connected to the ball carrying disc and another plurality of discs drivably carried by the cylindrical housing and interposed between the first mentioned plurality of discs. When the clutch is effective, the two sets of discs are yieldably held in frictional engagement by a spring on the sleeve.

For a full and more complete understanding of the invention, reference may be had to the following description and the accompanying drawings wherein:

FIG. 1 is a perspective of a transmission embodying the precepts of this invention with a portion of the housing and elements therein broken away and shown in section;

FIG. 2 is a diagrammatic view of the peripheral surface of the ball carrying disc as flattened and illustrating the staggered arrangement of the balls in a somewhat distorted relation;

Figure 4:
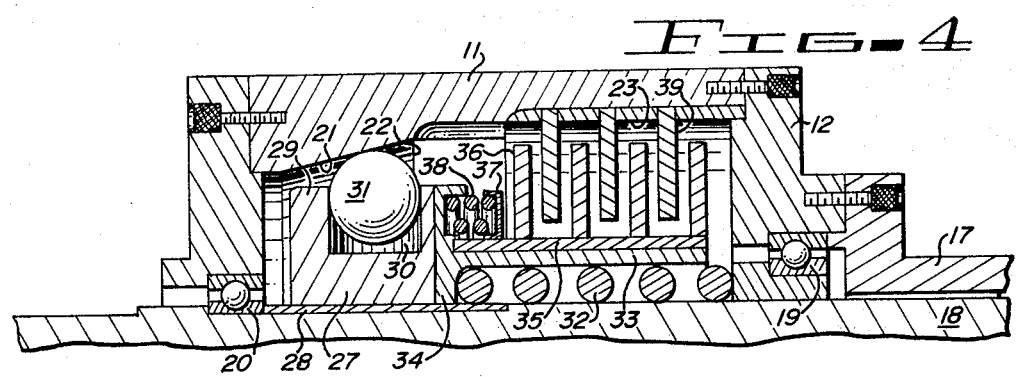
Figure 5:
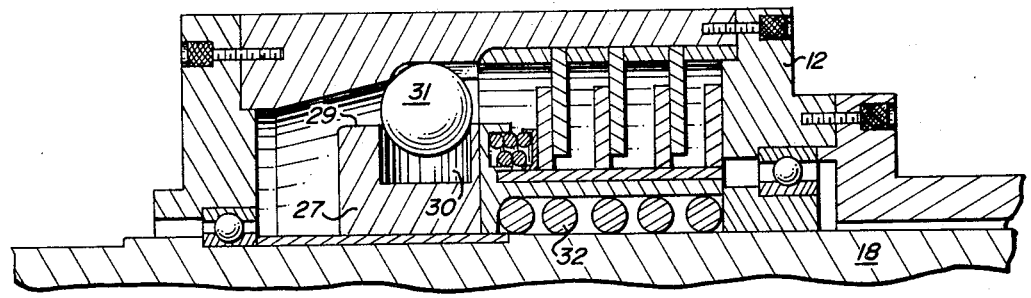

FIG. 4 is a fragmentary axial section of one half of the transmission with the spacing between the clutch discs exaggerated to enhance the clarity of illustration and depicting an intermediate position of the balls relative to the conical surface, and FIG. 5 is a sectional view similar to FIG. 4 illustrating the position in which the balls are received in the recesses to establish the 1:1 ratio between the driving and driven members.

DESCRIPTION OF THE PREFERRED EMBODIMENT

Referring now to the drawings wherein like reference characters denote corresponding elements throughout the several views, and first more particularly to FIG. 1, a housing is identified in its entirety by the reference character 10 and comprises a cylindrical wall 11 and end walls 12 and 13 which are secured to the end faces of cylindrical wall 11 in any preferred way, such as by screw bolts 14, the heads of which are counter-sunk in recesses in the exposed faces of end walls 12 and 13.

End wall 12 is formed with a reduced extension 15. Secured to extension 15 as by screw bolts 16 is a power take-off 17. An input shaft 18 passes through power take-off 17 and is journalled in a bearing assembly 19 mounted in end wall 12 and a second bearing assembly 20 in end wall 13.

Referring now more particularly to FIGS. 4 and 5, cylindrical wall 11 is formed at the end adjacent to end wall 13 with a conical surface 21, the wider end of which is identified at 22 and which is disposed inwardly of the housing. Cylindrical wall 11 also includes an inner cylindrical surface 23. Immediately adjacent to wide end 22 of conical surface 21, cylindrical surface 23 is formed with a plurality of arcuate recesses 24. In the embodiment illustrated, there are four of the recesses 24 in equi-angularly spaced relation.

Figure 3:
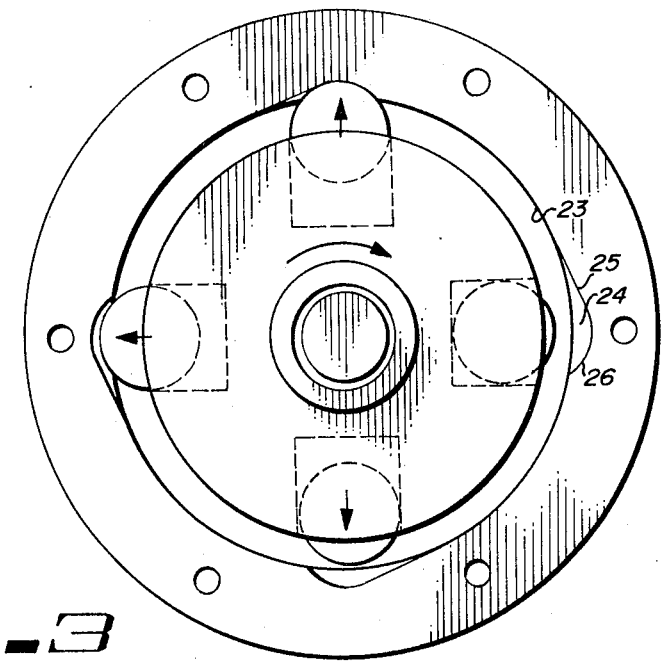
FIG. 3 is a view in end elevation of one end of the transmission with an end plate removed.

Upon referring to FIG. 3, it will be noted that each recess 24 has a bottom wall 25 at a comparatively small angle of inclination with respect to the cylindrical surface 23. In fact, it amounts to substantially a tangential continuation thereof. The bottom wall 25 of each recess 24 has an end surface 26 which is comparatively steep or abrupt. The end of each recess 24 remote from the abrupt surface 26 is identified as the ball entry end, speaking with reference to the direction of rotation as depicted by the arrows in FIG. 3. The recesses 24 are axially staggered or offset in a progressive series. Thus, one recess 24 is more closely adjacent to the wide end 22 of conical surface 21. The next recess 24 is axially spaced from the first recess about one-eighth of an inch, the third recess, one-eighth of an inch from the second, and the fourth, one-eighth of an inch from the third.

A ball carrying disc 27 is keyed to shaft 18 by the splines represented at 28. Disc 27 is positioned in housing 10 adjacent to end wall 13. Disc 27 has a peripheral cylindrical surface 29 into which open a plurality of equi-angularly spaced recesses or sockets 30. In the illustrated embodiment, there are four of these sockets 30, because there are four recesses 24 in cylindrical wall 11.

Referring for the moment to FIG. 2, it will be noted that this view depicts the cylindrical surface 29 as flattened out and illustrates the relation of the sockets 30 in a somewhat distorted arrangement. Sockets 30 are arranged in an axially staggered or offset relation corresponding to the arrangement of the recesses 24. Thus, a first socket 30 is located closely adjacent to a wide edge of cylindrical surface 29. A second socket 30a is axially offset with respect to socket 30 a distance of about one-eighth of an inch. A third socket 30b is axially offset from socket 30a one-eighth of an inch and socket 30c is offset from socket 30b one-eighth of an inch and is located closely adjacent to the side edge of surface 29 remote from that which is closely adjacent to socket 30. A steel ball 31 is received in each socket 30 and is radially movable therein. An expansion coil spring 32 is disposed about shaft 18 between end wall 12 and disc 27. This spring 32 normally biases ball carrying disc 27 towards end plate 13 to cause balls 31 to engage conical surface 21 as depicted in FIG. 3.

While the drawings illustrate a disc clutch to be later described, such a clutch is not essential to the operation of the transmission mechanism so far described. Hence, at this point, it is deemed advisable to describe the operation with the clutch omitted.

it will be understood that input shaft 18 and ball carrying disc 27 constitute a driving assembly, while housing 10 and power take-off 17 constitute a driven assembly. With shaft 18 at rest, spring 32 urges disc 27 substantially into engagement with the inner face of end wall 13 or slightly spaced therefrom, in which position conical surface 21 depresses balls 31 into their innermost radial positions. As shaft 18 is rotated and the speed of rotation increased, balls 31 are moved outwardly under centrifugal force. Due to their engagement with conical surface 21 two functions are performed. One of these is that ball carrying disc 27 is moved away from end wall 13 against the influence of spring 32. The other is that housing 10 is imparted rotation.

At the start of rotation, the ratio between the rate of rotation of shaft 18 relative to housing 10 is high. That is, the housing rotates at a lower rate than does shaft 18. This ratio is gradually decreased as the balls move towards the wider end 22 of conical surface 21.

When disc 27 reaches a position in which socket 30 is disposed opposite to its corresponding recess 24, the ball in socket 30 will enter the recess 24 at the entry end of bottom surface 25. It will then move in the recess repidly and engage the end surface 26 thereof with a hammer-like impact which rapidly increases the speed of rotation of housing 10. Second socket 30a will then come opposite to its corresponding recess 24 and the ball 31 therein will enter this recess and engage the end surface 26 thereof in the manner above described. Socket 30b then comes opposite to its corresponding recess 24 and the ball 31 therein enters this recess and strikes the end wall 26 thereof with an impact. The same action takes place when socket 30c comes opposite to its corresponding recess 24. It is evident, therefore, that the housing 10 is subjected to a series of impacts to speed up its rotation until a 1:1 ratio between the driving assembly and the driven assembly is established.

With only one ball 31 received in a recess 24, there is eatablished a ratio corresponding to a low gear ratio. To improve the action within this ratio, a clutch disc mechanism is interposed between the driving and driven assemblies. Thus, a sleeve 33 is disposed about shaft 18 in spaced relation relative thereto with the spring 32 being disposed in the space so defined. Sleeve 33 has an end flange 34 which engages an end face of ball carrying disc 27. Non-rotatable and slidable on sleeve 33 is a tubular disc carrier 35 from which outstand a set of clutch discs 36. A spring abutment 37 is carried by disc carrier 35 and an expansion coil spring 38 is interposed between abutment disc 37 and end flange 34.

A second set of clutch discs 39 are drivably mounted on cylindrical wall 11 and extend inwardly therefrom between clutch discs 36.

When the driven assembly is subjected to a high load, such as when the transmission is included in a motor vehicle and a hill is encountered, a slow rate of hill climbing is provided when only the ball 31 is socket 30 is received in its recess 24. This would correspond to the low gear of a conventional transmission. Under these conditions, there is a tendency for housing 10 to drift backwards the same amount that the ball gains when it falls into the recess 24. The discs 36 and 39 are urged into engagement by the spring 38 as shown in FIG. 3, and thus prevent this rapid reverse action of the housing. Thus, full advantage is derived from the forward hammer-like impact of steel ball 31 striking the end wall 26 of recess 24.

While a preferred specific embodiment is herein disclosed, it is to be clearly understood that the invention is not to be limited to the exact construction, devices and mechanisms illustrated and described because various modifications of these details may be provided in putting the invention into practice.

What is claimed is:

1. In a transmission:
   a. a driving assembly comprising an input shaft and a disc splined thereon and having a peripheral cylindrical surface;
   b. a plurality of sockets in said disc opening onto said peripheral surface, arranged in axially offset staggered relation and equi-angularly spaced apart;
   c. a steel ball radially movable in each of said sockets;
   d. a driven assembly comprising a housing and a power take-off;
   e. said housing including a cylindrical wall and a pair of end walls;
   f. said shaft being journalled in said end walls;
   g. said cylindrical wall having a conical surface at one end, with the conical surface presenting its wider end inwardly of the cylindrical wall;
   h. said cylindrical wall having an inner cylindrical surface adjacent to the wider end of said conical surface and formed with a series of equi-angularly spaced arcuate recesses in axially offset staggered relation, and
   i. spring means in said housing for urging said disc towards and inwardly of said conical surface, whereby when said shaft is rotated and the speed of rotation increased, said balls move outwardly of the sockets under the influence of centrifugal force and due to their engagement with said conical surface move said disc axially inwardly of the housing to progressively bring said sockets opposite to said recesses whereupon the balls enter the recesses in succession and engage ends of the recesses with hammer-like impacts.

2. The transmission of claim 1 in which said spring means takes the form of an expansion coil spring disposed about said shaft and interposed between an end wall of the housing and said disc.

3. The transmission of claim 1 in which each of said arcuate recesses has a ball entry end and an abrupt end wall spaced from said ball entry end.

4. The transmission of claim 3 in which said entry end is defined by a bottom surface of the recess which is substantially a tangential continuation of the inner cylindrical surface and which bottom surface merges in with said abrupt end wall.

5. The transmission of claim 1 in which there are four of said sockets and four of said arcuate recesses.

6. The transmission of claim 5 in which a first socket is located closely adjacent to a side edge of the cylindrical surface of said disc, a second socket is axially offset from said first socket a distance of substantially one-eighth of an inch, a third socket is axially offset from said second socket a distance of substantially one-eighth of an inch, and a fourth socket is axially offset from said third socket a distance of substantially one-eighth of an inch and is located closely adjacent to the other side edge of said cylindrical surface, and said arcuate recesses are axially offset in an arrangement corresponding to the staggered offset relation of said sockets.

7. The transmission of claim 1 together with a disc clutch interposed between said disc and said housing.

8. The transmission of claim 7 in which said disc clutch comprises a set of clutch discs in driving relation to the disc of said driving assembly and a second set of clutch discs interposed between said first set and in driving relation to said housing.

* * * * *